Jan. 22, 1957  A. M. STEFFEN  2,778,288
STEREOSCOPIC CAMERA
Filed Dec. 16, 1952  2 Sheets-Sheet 1

ARNOLD M. STEFFEN,
INVENTOR.

HUEBNER, BEEHLER,
WORREL & HERZIG,
ATTORNEYS.
BY
Albert M Herzig

Jan. 22, 1957 A. M. STEFFEN 2,778,288
STEREOSCOPIC CAMERA
Filed Dec. 16, 1952 2 Sheets-Sheet 2
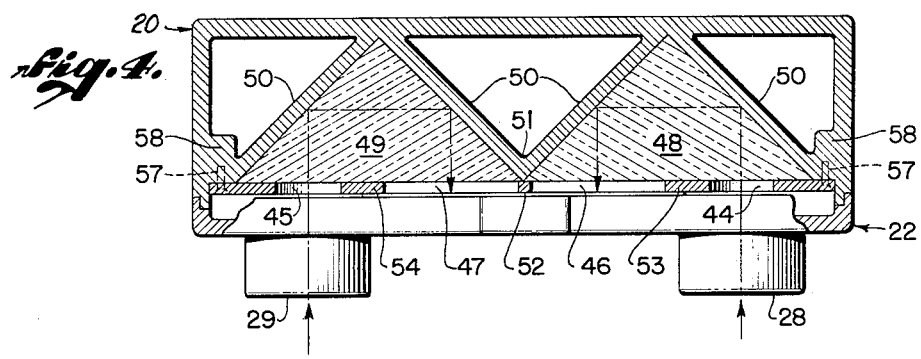
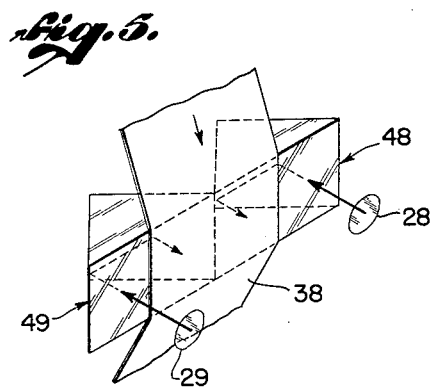
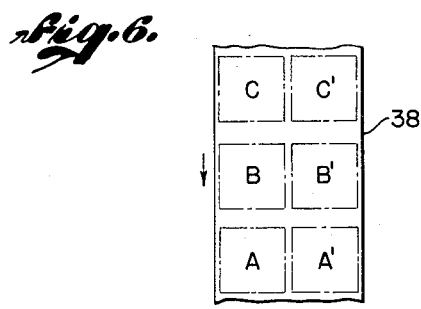
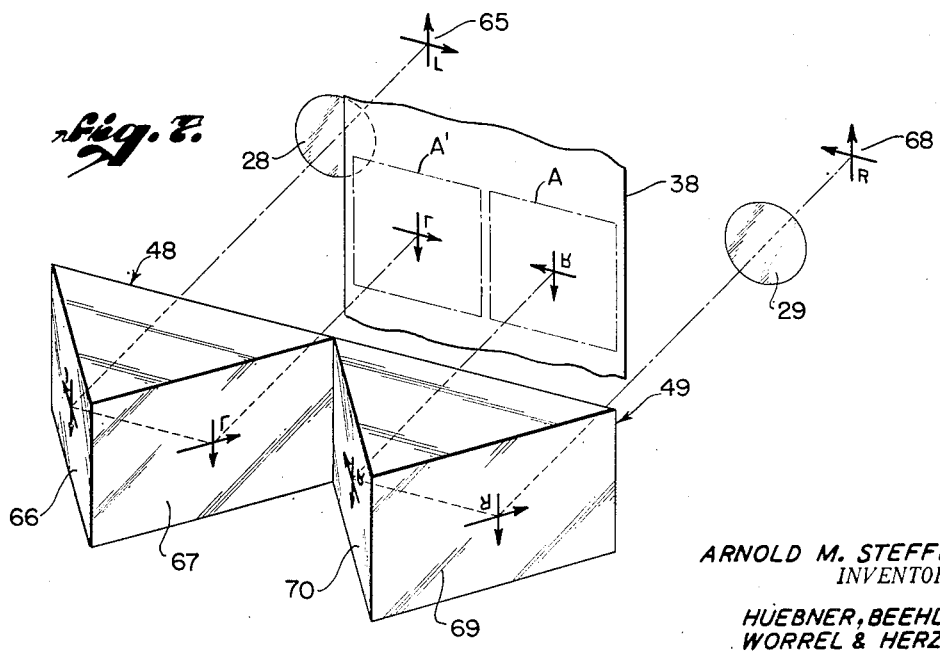
ARNOLD M. STEFFEN,
INVENTOR.
HUEBNER, BEEHLER,
WORREL & HERZIG,
ATTORNEYS.
BY Albert M Herzig

United States Patent Office 2,778,288
Patented Jan. 22, 1957

2,778,288
STEREOSCOPIC CAMERA
Arnold M. Steffen, Los Angeles, Calif.

Application December 16, 1952, Serial No. 326,255

2 Claims. (Cl. 95—18)

This invention relates to stereoscopic photography and more particularly to a stereoscopic camera so constructed and arranged that a standard or the like roll film can be directly utilized, after development, to obtain a printed pair of suitably juxtaposed prints directly observable in a stereo-viewer.

In the prior art of stereo-photography it has been the practice to separately photograph distinct film images of the optically separated stereo views of the subject. The separate images thus obtained upon negative film have been also developed, then remounted the required interpupillary distance apart in properly inverted and/or reversed relationship to permit direct viewing. Consequently the photographic process has included the preparation of stereo-positive prints from the usually separate or mutually incorrectly oriented negatives.

In color photography these procedures have proven particularly costly, so that it has become highly desirable and important to provide a correctly oriented camera and film construction preferably utilizing universally conventional or commercial available roll film by which development of separate negatives or their re-mounting and re-orientation can be obviated.

In view of the above and other considerations, it is among the objects of this invention to provide a new and improved camera construction by which the above mentioned difficulties, among others, can be overcome and by which the desired results herein contemplated can be achieved.

It is also among the objects of this invention to provide a new and improved camera construction in which stereoscopic photography is achieved in a position and arrangement of the stereo-differentiated views for unaltered direct viewing in a stereo-viewer to be provided.

Another object of the invention is to the provision of such an improved camera of the desired character described wherein commercially available roll film may be directly employed both for recording a scene and viewing the same after processing.

Another and more specific object of this invention is to provide a camera of the character described wherein the film emulsion is not directed at the scene when the picture is taken, but rather towards the taker as he faces the scene.

Yet another object of this invention is the provision of a new and improved camera construction wherein left and right images are inverted and individually reversed after passing through their respective lenses so as to be in proper position and arrangement for direct viewing on the negative or print therefrom, or direct positive when the same is processed or developed.

This invention also has among its objects the improvement of prior art devices heretofore intended to accomplish generally similar purposes.

Other and more specific objects and advantages will appear and be brought out more fully in the following specification considered with reference to the accompanying drawings throughout which like parts are designated by like numerals.

In the drawings:

Figure 4 is a top sectional view taken as on a line 4—4 of Figure 2.

Figure 5 is a schematic view of the essentials of a preferred means and method of accomplishing the desired results of the invention.

Figure 6 is a diagrammatic view of a film roll section showing the arrangement of the stereo views thereon, as seen from the emulsion side of the film.

Figure 7 is a further schematic view showing the inversion and reversal of the individual right and left images of an object upon a film.

Figure 1:
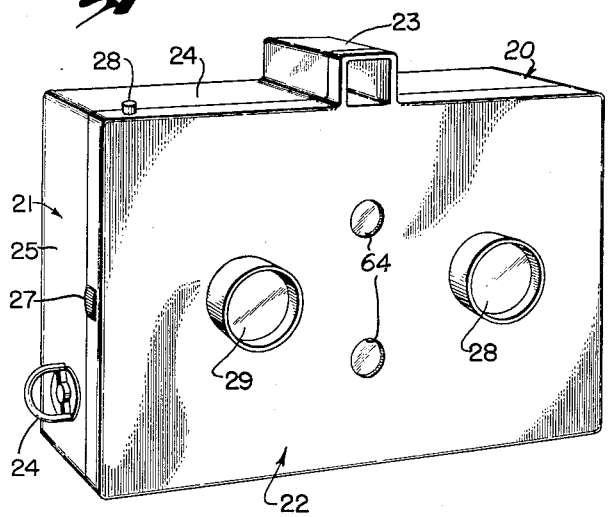
Figure 1 is a perspective view of a stereo-camera embodying this invention.
Figure 3:
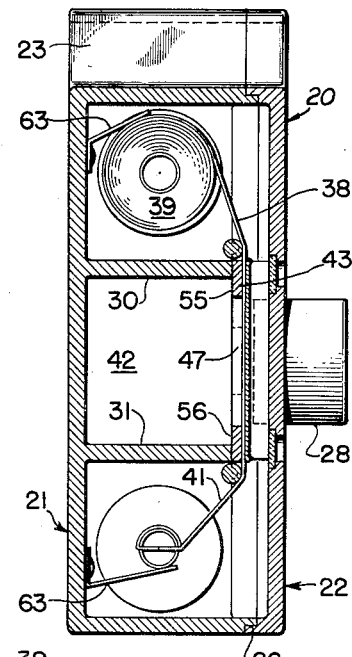
Figure 3 is a vertical sectional view taken as on a line 3—3 of Figure 2.
Figure 2:
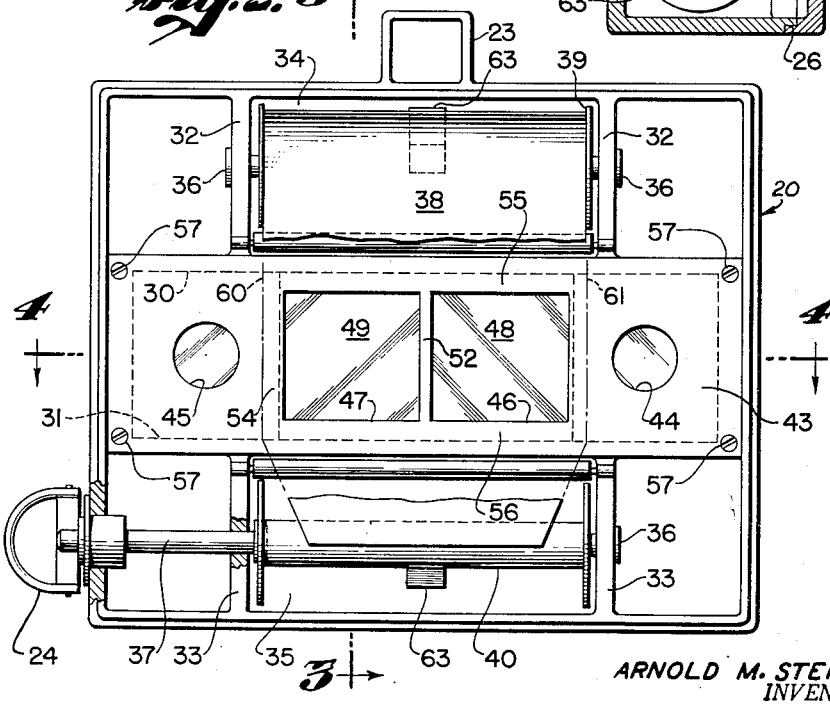
Figure 2 is a view of the interior of the camera of Figure 1, the front cover being removed.

Referring more particularly to the drawings, there is shown by way of example but not of limitation a stereo camera generally designated at 20, comprising a back portion 21 and a front cover portion 22.

Any suitable view finder 23 is conventionally mounted as on a top wall, and a winding key is also positioned conventionally at 24 as on a side wall 25.

The back 21 and front 22 are secured together by a conventional flanged light-trap construction 26 around their mutually engaging edges, by means of any suitable releasable catch including a finger piece 27.

Likewise a conventional shutter control mechanism can be employed, preferably actuating a shutter for both lens openings as by a common manipulative control as at 28, said shutter and control construction being within the ability of one skilled in this art.

The back and front portions 21 and 22 collectively define an interior chamber, separated by upper and lower horizontal partitions 30 and 31 respectively into upper middle and lower sections, the first and last of which are preferably also provided with film-roll holding partitions 32 and 33 respectively defining between them film-roll recesses 34 and 35.

Film rolls of any predetermined desired size are rotatably mounted upon releasable bearings 36 and 37, one (37) of which is keyed in a well known manner to the axially movable winding key 24.

The film 38 is drawn from the supply spool 39 to the winding spool 40, with the emulsion 41 on the inside, i. e., facing said middle section 42. A guide plate 43 covering the middle section is formed with left and right apertures 44 and 45, and with a pair of film windows 46 and 47.

The central section is further provided with a reflecting means preferably in the form of prisms 48 and 49 mounted as against diagonal wall supports 50 preferably having a separational apex 51 which engages, in light-tight fashion, the plate 43 at a partition 52 which separates the windows 46 and 47.

Additional light locks are preferably also provided by said plate 43, as at 53 and 54, and by said back of the camera, as at 55 and 56, as required. The plate may be secured as by screws 57 to said back section of the camera by means of bosses 58 provided therein for such purpose.

The left double-reflecting prism 48 individually comprehends the left film window 46 and the left lens opening 44. Similarly the right double-reflecting prism 49 comprehends the righthand window 47 and the right lens opening 45 corresponding therewith.

In the use of the invention a roll of negative film for positive print viewing or preferably color film, of any desired width corresponding to the most desirably predetermined size of the camera, is placed in the supply film recess 34 and threaded as under the guide plate 43, but in any event past the windows 46 and 47.

Such windows are each of a size to correspond to the final desired size of the stereogram or picture. Taken together they lie within the outer right and left edges 60 and 61 of the film, so that the view C (Figure 6) from the right lens 29 will be juxtaposed on said film with the corresponding but angularly divergent view C'. The combination of the left and right views C and C', respectively, gives a stereo-picture when viewed through a proper stereoscope.

When the film is turned one frame, a second pair of exposures is obtained on the portions B and B', also comprising collectively a stereo-picture. The next frame, C and C', can also comprise a stereo-picture, and so on. Leaf springs 63, which normally bias the film rolls, prevent slippage of the film between such frames.

The instant camera, unlike conventional types, has picture-number viewing apertures 64 on the face of the camera in order to advance the roll-film to the next taking position. Successive film sections are selected by looking into the windows on the front of the camera.

Reference to Figures 5 and 7 shows that the left lens 28 gives a left-eye image 65 of a corresponding object, which is inverted and reversed by the lens and then the inverted image again reversed through double reflection on the prism faces 66 and 67, so that the resultant image is merely inverted as it is projected onto the emulsion side of the film, e. g., on the emulsion side of the film portion A'.

Similarly, the right-eye image 68 (which is angularly separated from the left-eye image at least corresponding to the interpupillary distance) is reversed and inverted by the lens 29, then re-reversed on the faces 69 and 70 of the prism 49, and projected on the emulsion side of the film portion A.

The resultant respective left and right images A and A' are one desired stereo-picture as exposed on the film 38. When the film is developed, the transparency thus derived can be directly used in a stereogram without remounting, rearranging, or printing.

Each composite A—A', B—B', C—C', etc., is a separate stereogram. As a result, a continuous roll of film may be viewed with consecutive stereo scenes or need only be cut transversely between said composite sections A—A', B—B', C—C', etc., to make a number of stereo-transparencies in color or otherwise, corresponding to the number of said frames which can be cut from a single roll. Each will be an inverted left and right view correctly positioned and inverted as desired, for direct viewing.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and methods.

I claim:

1. A stereo-camera comprising a box, a pair of fixed double reflector means mounted in side by side juxtaposition in said box, a pair of horizontally separated lenses mounted in the front of the box to invert and reverse the image of an object respectively viewed through said lenses and for respectively throwing said images upon one reflector of each of said double reflector means, a pair of windows formed in said box in side by side contiguous relationship between and aligned with said lenses in a position to receive, respectively, corresponding images thrown from the other reflector of each of said reflector means, roll film holding and guiding means within said box including a single vertical film guide centered between said lenses for training a single roll of film past and over both said windows for receiving thereon substantially simultaneous side-by-side images projected thereon from said reflector means, and shutter means for said lenses including a common control for selectively exposing said film, the over-all width of both of said windows being less than that of the film to permit left and right eye images to be formed on the single film in paired side-by-side relationship respectively therealong, the emulsion side of said film being exposed through said windows and said emulsion thereby facing rearwardly relative to the camera and normally towards the taker.

2. A stereo-camera comprising a box, a pair of fixed double reflector means mounted in side-by-side juxtaposition in said box, a pair of horizontally separated lenses mounted in the front of the box to invert and reverse the image of an object respectively viewed through said lenses and for respectively throwing said images upon one reflector of each of said double reflector means, a pair of windows formed in said box in side-by-side contiguous relationship between and aligned with said lenses in a position to receive, respectively, corresponding images thrown from the other reflector of each of said reflector means, roll film holding and guiding means within said box including a single vertical film guide centered between said lenses for training a single roll of film past and over both said windows for receiving thereon substantially simultaneous side-by-side images projected thereon from said reflector means, and shutter means for said lenses including a common control for selectively exposing said film, the over-all width of both of said windows being less than that of the film to permit left and right eye images to be formed on a single film in paired side-by-side relationship respectively therealong, the emulsion side of said film being exposed through said windows and said emulsion thereby facing rearwardly relative to the camera and normally towards the taker, said box comprising upper and lower horizontal partitions dividing said box into upper, lower and middle forwardly open chambers, the middle chamber having said reflectors fixedly mounted therein and a guide plate over the open front side thereof, said plate having said windows formed therein, having lens openings in alignment with the said lenses and their respective reflectors, said plate and said box defining said guide, and a front cover releasably secured to said box over said guide plate, said lenses being mounted on said cover.

References Cited in the file of this patent

UNITED STATES PATENTS

| Number | Name | Date |
|---|---|---|
| 1,351,508 | Duhem | Aug. 31, 1920 |
| 1,513,984 | Griffith | Nov. 4, 1924 |
| 1,589,754 | Griffith | June 22, 1926 |
| 1,744,459 | Fairall | Jan. 21, 1930 |
| 2,283,466 | Schensted | May 19, 1942 |
| 2,298,586 | Phillips | Oct. 13, 1942 |
| 2,385,804 | Fitz | Oct. 2, 1945 |
| 2,517,246 | Seitz | Aug. 1, 1950 |